Patented Mar. 29, 1932

1,851,383

UNITED STATES PATENT OFFICE

LLOYD C. DANIELS, OF CRAFTON, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

PURIFYING PHTHALIC ANHYDRIDE

No Drawing. Application filed May 31, 1930. Serial No. 458,917.

This invention relates to the purification of phthalic anhydride and more particularly to its purification by distillation processes.

In the commercial manufacture of phthalic anhydride by the catalytic oxidation of naphthalene and fractional condensation of the phthalic anhydride vapors, a large proportion of the condensate contains impurities such as alphanaphthaquinone, maleic acid, benzoic acid and tarry bodies, which cause discoloration of the product and lower its market value. Such impure products are commonly purified by prolonged heating, either with or without condensing agents, followed by distillation of the product from the undesired impurities which have been rendered less volatile by the treatment. The impurities themselves are thus left behind in the still as a residue which eventually takes the form of a dark colored tar or coke.

The condensation of the impurities by this method is quite complete and it is possible to heat the still residues to quite high temperatures and to distill practically all of the phthalic anhydride from the residue without carrying over much of the impurities, and for this reason the practice has been to distill the greatest possible amount of phthalic anhydride from the coke. Such practice, however, involves the heating of an almost empty still to high temperatures, and results not only in warping and thus shortening the life of the still but produces a hard layer of coke over the bottom of the still which is a poor conductor of heat and requires even more intense heat after a few charges have been run. For this reason the practice has been to use pot stills with successive charges which have been run by the batch process and the coke has been allowed to accumulate, the still being cooled and the hard coke removed by hand when it had accumulated in sufficient quantities.

In spite of the short life and frequent shutdowns of the pot stills, this method has been previously considered the most economical because it recovers almost all of the phthalic anhydride from the condensed impurities and thus produces a higher yield of available product. The coke itself has been considered practically worthless, and has usually been discarded as a waste product.

The present invention is based on the surprising discovery that the phthalic anhydride contained in the still residue can be recovered in excellent purity by means of leaching. The leaching may be effected by water, in which case the values are obtained as phthalic acid, or it may be effected by alkaline solutions such as dilute ammonium hydroxide, in which case a salt of the phthalic acid is obtained. As the phthalic anhydride in the still residue can readily be recovered by this method, it is no longer necessary to carry on the distillation process with the sole object of distilling off as much phthalic anhydride as possible, and it is, therefore, possible to effect economical revisions in the entire process.

According to the present invention the distillation of the impure phthalic anhydride is carried out from large stills by either the continuous or batch process, local overheating being prevented by continuous agitators and the temperature of the residue being maintained below 350° C. In this way the residue in the still is always liquid and it is entirely feasible to use rotary agitators, the shoes of which would have been clogged or broken by the hard coke formed at the higher temperatures previously used. The tarry residue is allowed to remain in the still, additional molten phthalic anhydride being added thereto, until a sufficient charge has accumulated to be drawn off into moulds, in which it is allowed to cool and harden. The presence of a liquid in the still bottom at all times prevents uneven heating and warping of the still and the much lower temperatures used result in a greatly increased life for the entire apparatus.

The prolonged heating of the tarry residue in the still after the phthalic anhydride has been distilled from it is a factor in the surprising purity of the phthalic acid that can be leached from it. This prolonged heating results in further condensation of the impurities found in the original charge and also in pyrogenetic condensation of may of them; for example, the maleic acid which may be present in the original charge in amounts up to 5% is completely absent in the tarry residue and many of the colored impurities are destroyed. By maintaining the residue in the form of a tar it is therefore possible not only to increase the facility of operation of the distillation process but to obtain an actual increase in the total amount of phthalic recovered as anhydride and acid.

To prepare the still residue for leaching, a number of processes may be used. The soft tar may be hardened in moulds and then ground, or it may be flaked on a rotary drum, or porous material such as cinders, coke and the like may be incorporated with it while it is still soft and the hard product broken into pieces. Moreover the residue, while yet in the still, may be subjected to physical or chemical treatment to aid in the leaching. For example, it is known that the acid salts of phthalic acid, and particularly the acid salts of the alkali metal, are more soluble than is phthalic acid itself; therefore, the residue which may contain up to 50% of phthalic acid may be partially neutralized to form these acid salts, which are more readily leached.

The leaching itself may take place by any of the usual processes, but since it is desirable to recover the phthalic acid in as strong a solution as possible the percolation or open drainage method is preferred. A particularly effective method of procedure for use when the residue has been ground is to moisten the mass thoroughly with water, thus agglomerating the fines onto the coarse particles and then to submit the mass to continuous recirculation of a small stream of the leaching liquid from above, the residue itself being retained on a screen or other foraminated foundation to permit ready drainage of the liquid which is recirculated to dissolve further values. As above stated, the leaching liquid may be water or a dilute solution of an alkali such as ammonia, but it is to be noted that in cases where alkaline solutions are used the solution must not be too concentrated nor may more than enough alkali be present than the amount required for complete neutralization of the phthalic acid or certain colored impurities will be dissolved from the residue along with the phthalic anhydride values.

It is to be noted that the product obtained by drawing off the residue as a liquid is itself a valuable product aside from the value of its phthalic anhydride content. It is a synthetic resin containing a large proportion of phthalic anhydride in extremely uniform distribution, and subsequent grinding and treatment with glycerol or other polybasic alcohols will produce a commercial resin having many desirable properties.

The invention will be described in greater detail in connection with the following examples, it being understood that these are entirely for purposes of illustration and that the invention is not limited thereto.

Example 1

A phthalic anhydride product which may contain phthalic anhydride values corresponding to 80–96%, maleic anhydride 1–7% and water insolubles 8–15% together with other impurities is charged in successive batches into a melter from which it is run into a horizontal still of 18,000 pounds working capacity. The molten material is continuously agitated and distilled until the boiling point of the residue is about 10–25° C. above that of phthalic anhydride, at which point a new charge is introduced. The distillation is repeated, allowing the residue to remain in the still under continuous heating and agitation until a sufficient amount has accumulated after which it is drawn off as a dark limpid liquid and allowed to harden in moulds.

The hardened product, which contains 20–50% of phthalic anhydride and no maleic anhydride, is then ground and leached with water, the recovery of phthalic acid amounting to 90–100% of theory expressed as phthalic anhydride.

Example 2

A product containing 86–97% phthalic anhydride and 0.7–4% maleic anhydride together with other impurities is distilled as described in Example 1. 65–80% of the charge is recovered as phthalic anhydride of 97–99.5% purity and the residue, containing 20–40% phthalic anhydride and no maleic acid is run off into moulds, ground and thoroughly moistened with water in order to agglomerate the finer particles onto the coarser ones. It is then placed in an open drainage tank and leached with a 5–10% ammonia solution, the leaching liquid being continuously drawn off at the bottom of the tank and returned to the top. Practically all of the remaining phthalic anhydride is recovered as ammonium phthalate containing more or less acid ammonium phthalate.

Example 3

A phthalic anhydride product is distilled as described in Examples 1 and 2 but the residue, instead of being run into moulds, is flaked by hardening on a water-cooled drum followed by scraping with a knife. The product, which is quite brittle, is obtained in the form of thin flakes which are easily ground. After grinding the product is charged into two or more leaching vats and leached by the open drainage method on the countercurrent principle. The leaching liquid used in the last vat, which consists of a dilute solution of ammonium or sodium hydroxide, contains insufficient alkali to form the normal phthalate, so that the acid salt is obtained. The drainage from this vat is neutralized with more sodium or ammonium hydroxide to form the normal salt after which it is passed through the next preceding vat where it is again transformed into the acid salt. In this manner concentrated solutions of sodium or ammonium acid phthalate may be obtained without the danger of excess alkali which would cause the solution of undesired impurities. The partly exhausted residue in the later vats of the series is continuously leached with more dilute solution, thus obtaining an acid phthalate solution which is suitable for subsequent leaching of additional fresh material in earlier vats in the series.

What is claimed as new is:

1. A process which comprises distilling impure phthalic anhydride below the temperature of hard coke formation and running off the still residue as a liquid.

2. A process which comprises charging successive increments of impure phthalic anhydride into a still, distilling off the major portion of the phthalic anhydride therefrom below the temperature of hard coke formation until a sufficient amount of residue has accumulated, and running off this residue as a liquid.

3. A process which comprises subjecting impure phthalic anhydride to continued heating, distilling off the major portion of the phthalic anhydride therefrom below the temperature of hard coke formation, subjecting the residue to further continued heating below the temperature of hard coke formation and running it off as a liquid.

4. A process which comprises subjecting impure phthalic anhydride to continued heating, distilling off the major portion of the phthalic anhydride therefrom below the temperature of hard coke formation, subjecting the residue to further continued heating during subsequent addition and distillation of further increments of impure phthalic anhydride below the temperature of hard coke formation and running it off as a liquid.

5. A process which comprises subjecting impure phthalic anhydride to continued heating in the molten state in the presence of condensation agents, distilling off the major portion of the phthalic anhydride therefrom below the temperature of hard coke formation and running the residue off as a liquid.

6. A process which comprises subjecting impure phthalic anhydride to continued heating in the molten state in the presence of condensation agents, distilling off the major portion of the phthalic anhydride therefrom below the temperature of hard coke formation, subjecting the residue to further continued heating during subsequent addition and distillation of further increments of impure phthalic anhydride below the temperature of hard coke formation and running it off as a liquid.

7. A process according to claim 1, in which the impure phthalic anhydride is obtained from the catalytic air oxidation of naphthalene.

8. A process according to claim 3, in which the impure phthalic anhydride is obtained from the catalytic air oxidation of naphthalene.

9. A process according to claim 5, in which the impure phthalic anhydride is obtained from the catalytic air oxidation of naphthalene.

10. A process which comprises distilling impure phthalic anhydride below the temperature of hard coke formation, running off the residue as a liquid, allowing the residue to harden, and leaching the hardened residue with a solution which does not contain a greater amount of alkali than that molecularly equivalent to the phthalic anhydride present in the residue.

11. A process of purifying phthalic anhydride below the temperature of hard coke formation which comprises distilling it, subjecting the residue to continued heating below the temperature of hard coke formation, discharging the residue as a liquid, hardening and breaking up the residue, and recovering phthalic anhydride values therefrom by leaching with a solution which does not contain a greater amount of alkali than that molecularly equivalent to the phthalic anhydride present in the residue.

12. A process of treating still residue from the distillation of impure phthalic anhydride below the temperature of hard coke formation which comprises discharging it from the still as a liquid, allowing the liquid to harden, and grinding the hardened residue.

13. The process of recovering phthalic anhydride values from residue from the distillation of impure phthalic anhydride which comprises leaching it with a solution which does not contain a greater amount of alkali than that molecularly equivalent to the phthalic anhydride present in the residue.

14. The process of recovering phthalic anhydride values from residue from the distillation of impure phthalic anhydride which comprises leaching it with a leaching agent selected from the group consisting of water, aqueous alkaline solutions, and solutions of soluble salts of phthalic acid with a solution which does not contain a greater amount of alkali than that molecularly equivalent to the phthalic anhydride present in the residue.

15. The process of recovering phthalic anhydride values from residue from the distillation of impure phthalic anhydride which comprises leaching it with an aqueous solution of ammonium phthalate.

16. The process of recovering phthalic anhydride values from residue from the distillation of impure phthalic anhydride which comprises leaching it with a solution of ammonium hydroxide, the amount of ammonia not being sufficiently in excess of the amount molecularly corresponding to the phthalic anhydride present in the residue to substantially dissolve impurities soluble in ammonium hydroxide solutions.

17. A process of recovering phthalic anhydride values from hardened still residue from the distillation of impure phthalic anhydride which comprises leaching it with an alkaline solution, the amount of free alkali present after reaction with the phthalic anhydride present in the residue being insufficient to dissolve impurities soluble in solutions containing free alkali.

18. Still residue from the heating and distillation of impure catalytic phthalic anhydride below the temperature of hard coke formation which has been run from the still in liquid form and allowed to harden.

Signed at Pittsburgh, Pennsylvania, this 29th day of May, 1930.

LLOYD C. DANIELS.